United States Patent [19]
Hoffman et al.

[11] Patent Number: 5,970,689
[45] Date of Patent: Oct. 26, 1999

[54] VINEY CROP GUIDE FOR DISC MOWER CONDITIONERS

[75] Inventors: Charles H. Hoffman; Robert L. Rice, both of New Holland, Pa.

[73] Assignee: New Holland North America, Inc., New Holland, Pa.

[21] Appl. No.: 09/072,240

[22] Filed: May 4, 1998

Related U.S. Application Data

[62] Division of application No. 08/670,060, Jun. 25, 1996, Pat. No. 5,778,647
[60] Provisional application No. 60/000,817, Jun. 26, 1995.
[51] Int. Cl.[6] .................................................. A01D 75/30
[52] U.S. Cl. ...................................... 56/6; 56/94; 56/119
[58] Field of Search ................................ 56/6, 119, 192, 56/94, 80, 73, 84, 109, DIG. 20, DIG. 24

[56] References Cited

U.S. PATENT DOCUMENTS

| | | |
|---|---|---|
| 2,648,186 | 8/1953 | Beranek et al. . |
| 2,700,261 | 1/1955 | Scarlett et al. . |
| 3,881,305 | 5/1975 | Burrough ................................... 56/119 |
| 5,768,865 | 6/1998 | Rosembalm et al. .......................... 56/6 |

*Primary Examiner*—H. Shackelford
*Attorney, Agent, or Firm*—Larry W. Miller; J. William Stader; Frank A. Seemar

[57] ABSTRACT

A disc mower conditioner utilizing a modular disc cutterbar to sever standing crop material by impact action supports the cutterbar from the header of the mower conditioner by a pair of transversely spaced support arms mounted by spherical bushings to the header to allow flexing of the support arms as induced by the cutterbar. The mounting of the spherical bushings utilize conical washers engagable with conical sockets in spacers to limit vertical movement of the spacer relative to the header when the corresponding support arm flexes. The mower conditioner header further includes an optional viney crop guide that has a curved leading edge that directs viney crop downwardly into engagement with the adjacent disc cutter. The viney crop guide is also bent inwardly to contain and control the flow of crop material. The mower conditioner swathboard includes a position control mechanism that incorporates a positive down stop in the form of a pin riding within a corresponding slotted opening in an associated bracket to prevent the swathboard from coming into an inadvertent engagement with the conditioning rolls.

3 Claims, 13 Drawing Sheets

VINEY CROP GUIDE FOR DISC MOWER CONDITIONERS

CROSS-REFERENCE TO RELATED APPLICATIONS

This application is a division of U.S. patent application Ser. No. 08/670,060, filed Jun. 25, 1996, now U.S. Pat. No. 5,778,647, claiming priority on U.S. Provisional Patent Application Serial No. 60/000,817, filed Jun. 26, 1995.

BACKGROUND OF THE INVENTION

This invention relates generally to a machine for severing standing crops from the ground to initiate a harvesting process and, more particularly, to a mower conditioner incorporating a rotary disc cutterbar having a preselected number of transversely oriented cutter modules having rotatable discs supported thereon and carrying knives to sever standing crop by an impact action and convey the severed crop to a conditioning mechanism before being discharged to the ground.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262, issued to E. E. Koch and F. F. Voler, the descriptive portions thereof being incorporated herein by reference.

The construction of disc cutterbars has evolved over the years to the configuration of having a modular construction with cutter modules and spacer modules, such as shown in U.S. Pat. No. 4,840,019, issued to L. J. Pingry, the descriptive portions of which are incorporated herein by reference. In some instances, the cutter modules and the spacer modules were integrally formed into one unit such as shown and described in U.S. Pat. No. 4,947,629, issued to R. Ermacora and H. Neuerburg.

It has been found that the specific use of the disc cutterbar apparatus, e.g. whether used as part of a disc mower, such as shown and depicted in U.S. Pat. No. 4,955,187, issued to C. van der Lely, which is typically supported at one end, or as part of a disc mower-conditioner which usually provides support to the cutterbar at both opposing ends thereof, carries with that particular use a different set of design parameters than other machines in which the cutterbar is utilized.

For example, the load imparted stresses relative to the spacer segments or modules on a disc mower cutterbar are different that the corresponding stresses on a disc mower-conditioner cutterbar. The tensile loads on the cutterbar are highest at the rear and center when used in a disc mower-conditioner, but at the front and inboard tractor end of the cutterbar when utilized in a disc mower.

A modular disc cutterbar of the type shown in the aforementioned Pingry patent is made up of segments comprising drive modules and spacer modules which can be joined at flange faces with retention mechanisms like threaded fasteners. The cutterbar spacer modules which are used to space and support the drive modules need to be sized to carry the highest loads. Because of the need to keep spacer modules with a uniform size and configuration no matter where the location the spacer is used along the transverse length of the cutterbar, the same spacer configuration is used along the full length of the cutterbar, resulting in some spacer modules being lightly loaded and constructed stronger and heavier than is structurally needed.

The weight of the completed disc mower assembly on a disc mower-conditioner needs to be as light as possible to minimize the required size of the cutterbar flotation springs and to reduce the inertia forces imposed on the cutterbar components when the cutterbar strikes and slides over an obstacle at high ground speeds. The weight of the cutterbar when utilized in a disc mower configuration also needs to be as light as possible to minimize the force and friction from the ground to minimize the wear of the ground contacting skid shoes, and also to minimize the damage to the crop which comes in contact with the skid shoes. A further consideration in keeping the weight of the cutterbar as light as possible is to reduce the loads imposed on the frame components when the disc mower is placed into a transport position in which the total weight of the cutterbar is supported by the frame. A corollary consideration is the desire to keep these frame components as light as possible.

The disc cutterbar when used in a disc mower conditioner is supported near its ends with the center of the cutterbar underneath the conditioning rolls being unsupported. During operation in the field, the ground forces are exerted upward onto the cutterbar skid shoes. These forces deflect the cutterbar upward, particularly if the cutterbar is being operated on a ridge near the center of the cutterbar. This deflection of the center of the cutterbar causes the cutterbar support arms to also deflect. The rise of the mid-span of the cutterbar causes the cutterbar to bow and to twist the support arms. A rigid fixation of the support arms onto the disc mower conditioner header can result in cracking of the header side sheets.

It is important to maintain the cutterbar in a nearly precise vertical position relative to the header. Too much vertical motion of the cutterbar due to radial clearance at the cutterbar arm support joints will allow the cutterbar knives to strike the lower conditioning roll and cause the cutterbar drive joint to slide on its drive shaft, which can cause the shaft and joint hub to wear and/or apply a thrust load on the drive shaft as the cutterbar raises and lowers relative to the header while the drive is transmitting power.

When cutting long viney crops with a disc mower conditioner, a device is needed to guide the vines into the cutterbar knives so that the vines are cut rather than caught and pulled by the conditioning rolls. The vines that cause the most problem are growing laterally to the header. If the vines are not cut, but instead are pulled by the conditioning rolls, the power to the rolls increases significantly. The tractor engine RPM drops and the torque on the driveline components increases, and the rolls' lugs wear. In addition, the vines can wrap on the rolls if the vines are not cut.

Trailed implements, such as disc mower conditioners, with lift systems that are positioned with one or more hydraulic cylinders require a device to positively lock the implement in the raised position to insure that during transport on the highway the implement will not lower due to a hydraulic leak or failure. A mechanism is needed to permit the operator to engage a lever before getting onto the tractor that will engage the locking device automatically when the implement is raised into the transport position and bias the locking device in the locked position.

The same device is needed to also permit the operator, having arrived at the field, to engage the operator before getting on to the tractor such that the locking device will unlock when the implement is raised fully so that the operator can commence to use the implement without again dis-mounting from the tractor to unlock the locking device. The device is to also hold the locking device in the unlocked position so that the locking device does not engage when the implement is raised during field operation to clear the cut crop or an obstacle.

SUMMARY OF THE INVENTION

It is an object of this invention to overcome the aforementioned disadvantages of the prior art by providing improvements to known disc mower conditioner construction.

It is another object of this invention to provide a position control mechanism for the mower conditioner swathboard that incorporates a down stop to prevent the swathboard from engaging the conditioning rolls.

It is a feature of this invention that the position control mechanism for the swathboard incorporates a pin movable within a slot in an associated bracket to define extreme limits to the amount of movement permitted the swathboard.

It is an advantage of this invention that the position control mechanism for the mower condition swathboard incorporates a down stop to prevent an inadvertent dropping of the swathboard onto the conditioning rolls.

It is another advantage of this invention that the conditioning rolls are spared damage from an inadvertent engagement with the swathboard.

It is still another advantage of this invention that the mower conditioner swathboard is easily adjusted with a position control handle requiring one hand to operate.

It is still another object of this invention to provide a disc cutterbar support for a mower conditioner that withstands the flexing motion imparted by the disc cutterbar without transmitting the flexing motion to the header side sheets.

It is another feature of this invention that the mower conditioner disc cutterbar support incorporates a spherical bushing to accommodate flexing movement induced into the cutterbar.

It is still another feature of this invention that the mower conditioner disc cutterbar support arms incorporate a spacer utilizing conical washers and corresponding sockets in the spacers to limit the vertical movement of the cutterbar relative to the header.

It is yet another advantage of this invention that the flexing motion of the cutterbar will not cause damage to the header side sheets.

It is still another advantage of this invention that the header side sheets do not have to be reinforced to withstand flexing movements transmitted from the cutterbar.

It is a further advantage of this invention that the spherical bushings allow sufficient movement of the cutterbar relative to the header to permit one end of the cutterbar to be disconnected from the header without requiring disconnection of the other end of the cutterbar.

It is still a further advantage of this invention that the conical washers and corresponding sockets minimizes wear in the spacer to prolong the life of the spherical joint supporting the disc cutterbar support arm.

It is yet another object of this invention to provide a viney crop guide for the inboard end of a disc mower conditioner to force the viney crop into engagement with the first disc cutter.

It is a further feature of this invention that the viney crop guide is generally planar in shape with a leading edge that has a curved portion to direct the viney crops downwardly as the guide is advanced into the crop to be cut.

It is yet a further feature of this invention that the viney crop guide can be used as an optional attachment mounted by fasteners from the mower conditioner header shroud.

It is yet a further advantage of this invention that the lower portion of the viney crop guide is bent inwardly to contain and control the flow of crop material carried around by the outer disc.

It is yet another advantage of this invention that the viney crop guide permits operation of a disc mower conditioner in viney crop conditions without increased power requirements resulting from the conditioning rolls engaging unsevered viney crop.

It is still another object of this invention to provide a disc mower conditioner incorporating a modular disc cutterbar which is durable in construction, inexpensive of manufacture, carefree of maintenance, facile in assemblage, and simple and effective in use.

These and other objects, features and advantages are accomplished according to the instant invention by providing a disc mower conditioner utilizing a modular disc cutterbar to sever standing crop material by impact action. The cutterbar is supported from the header of the mower conditioner by a pair of transversely spaced support arms mounted by spherical bushings to the header to allow flexing of the support arms as induced by the cutterbar. The mounting of the spherical bushings utilize conical washers engagable with conical sockets in spacers to limit vertical movement of the spacer relative to the header when the corresponding support arm flexes. The mower conditioner header further includes an optional viney crop guide that has a curved leading edge that directs viney crop downwardly into engagement with the adjacent disc cutter. The viney crop guide is also bent inwardly to contain and control the flow of crop material. The mower conditioner swathboard includes a position control mechanism that incorporates a positive down stop in the form of a pin riding within a corresponding slotted opening in an associated bracket to prevent the swathboard from coming into an inadvertent engagement with the conditioning rolls.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
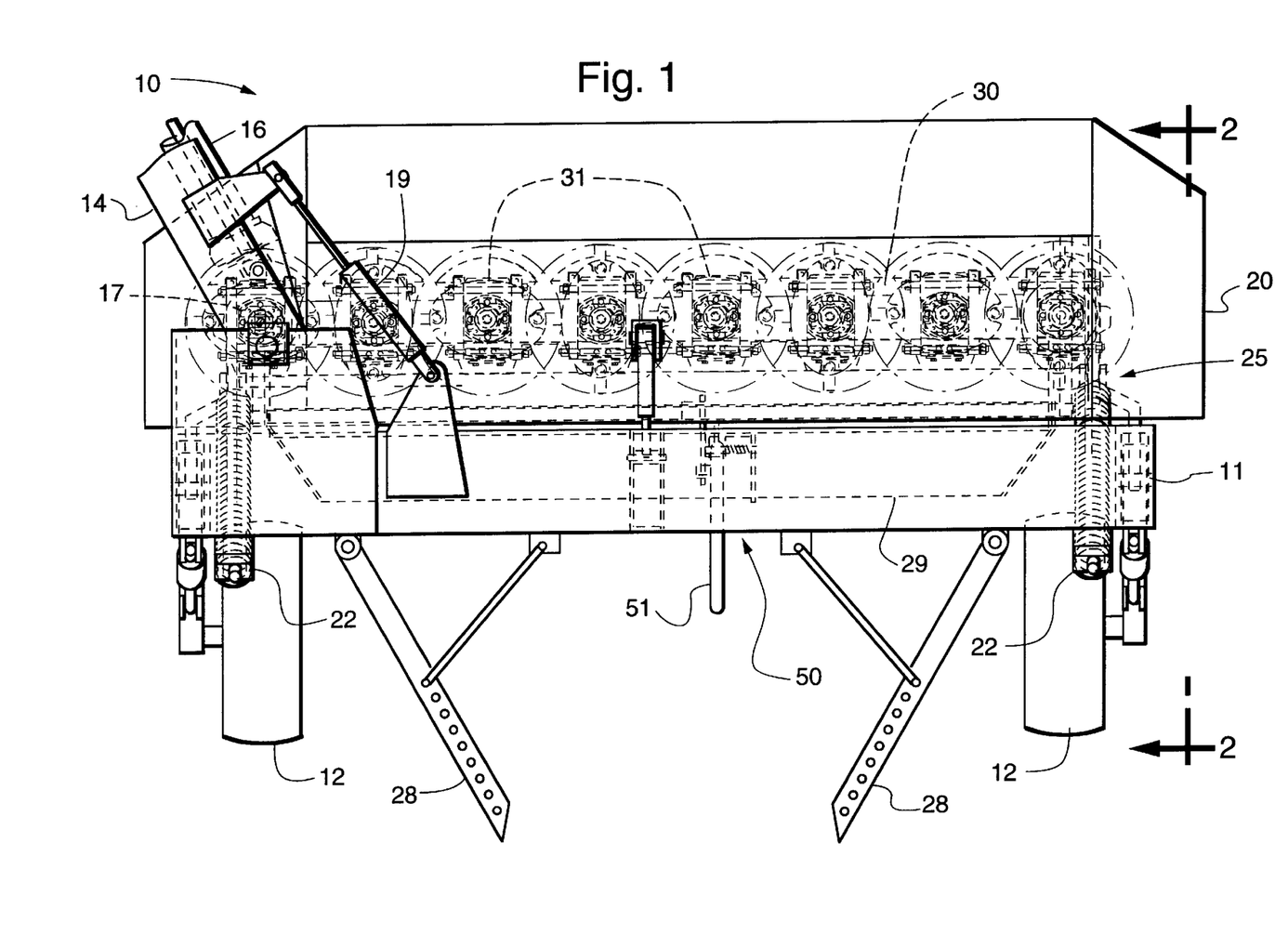
FIG. 1 is a top plan view of a disc mower conditioner incorporating the principles of the instant invention, the conventional draft tongue and PTO shaft being broken off for purposes of clarity.
Figure 2:
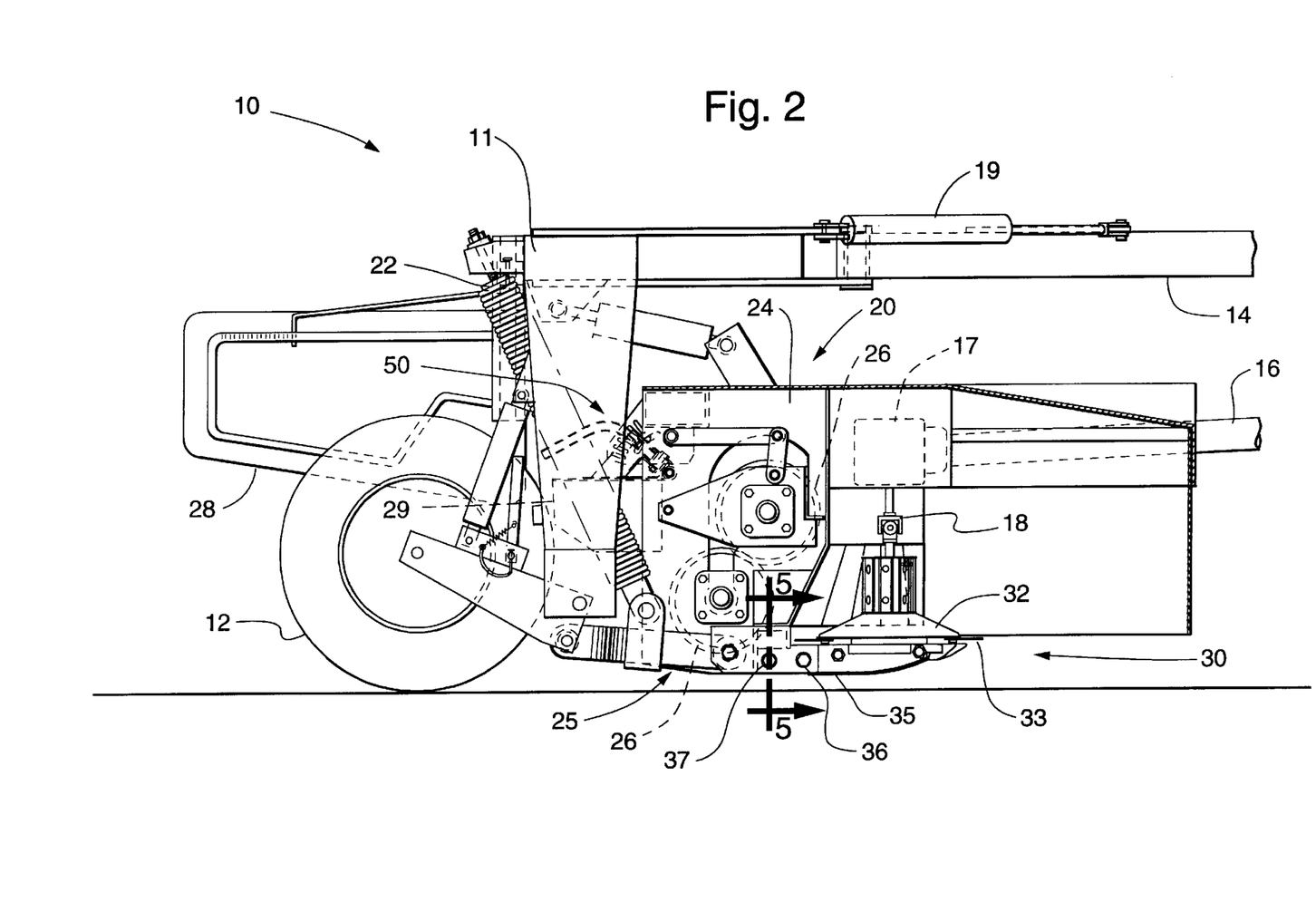
FIG. 2 is a cross-sectional view of the disc mower conditioner taken along lines 2—2 of FIG. 1 to depict a right side elevational view of the disc mower conditioner.
Figure 3:
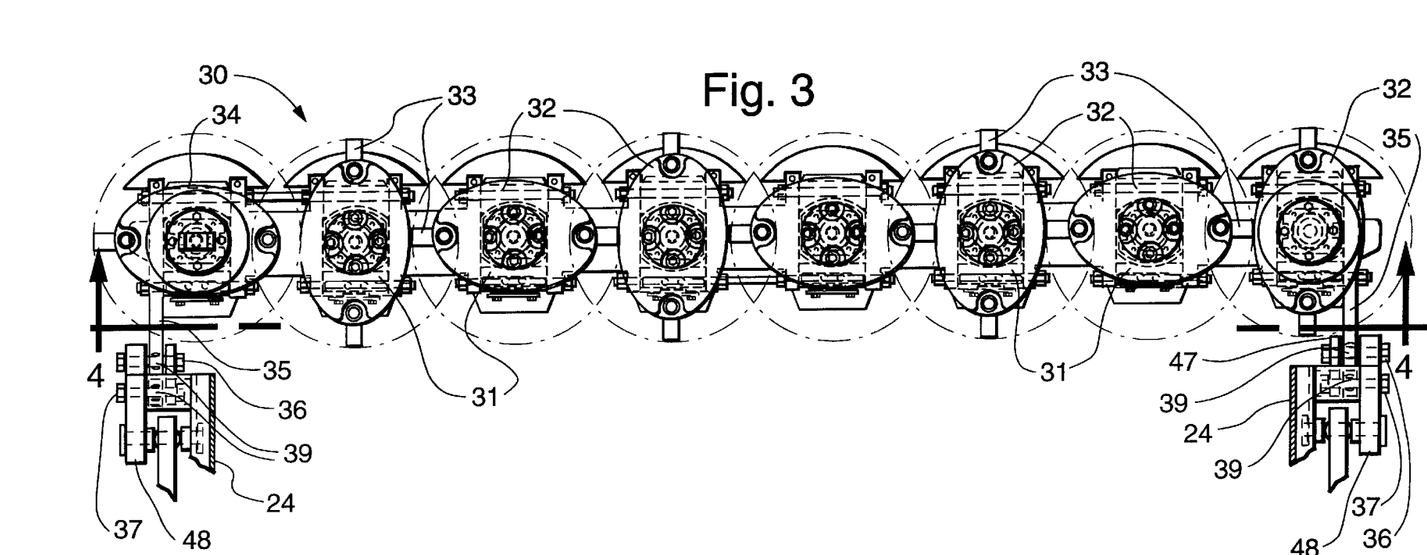
FIG. 3 is an enlarged top plan view of the modular disc cutter bar as utilized in the disc mower-conditioner shown in FIG. 1, the header support structure being broken off for purposes of clarity.

Referring now to the drawings and, particularly, to FIGS. 1 and 2, the disc mower conditioner utilizing a modular disc cutterbar and incorporating the principles of the instant invention can best be seen. Left and right references are used as a matter of convenience and are determined by standing at the rear of the machine facing forwardly into the normal direction of travel.

The disc mower conditioner 10 is provided with a generally conventional frame 11 mobilely supported over the ground by a pair of transversely spaced wheels 12 and a draft tongue 14 attached to the tractor (not shown), as is known in the art. Rotational power is delivered from the tractor (not shown) to the disc mower conditioner 10 by a power-take-off (PTO) shaft 16 rotatably coupled with the tractor in a conventional manner. As is known in the art, the draft tongue 14 is pivotally connected to the implement frame 11, the pivotal movement thereof being controlled by a hydraulic cylinder 19 interconnecting the tongue 14 and the frame 11. Through manipulation of the hydraulic cylinder 19, the disc mower conditioner 10 can be moved between a transport position behind the tractor and an operative position outboard to the right of the tractor so that the disc mower conditioner 10 can be operated without the tractor (not shown) running over the standing crop.

The frame 11 supports a header 20 suspended therefrom by a flotation mechanism 22 so that the header 20 can move vertically relative to the frame 11 to enable the header 20 to follow ground undulations and to allow the header 20 to be raised into an elevated transport position. The header 20 rotatably supports a conditioning mechanism 25, preferably in the form of a pair of intermeshing conditioning rolls 26 that receive severed crop therebetween and conditions the severed crop material. The conditioning rolls 26 discharge the crop material rearwardly into a pair of laterally spaced windrow shields 28 that consolidate the severed and conditioned crop into a windrow formed behind the implement 10.

A swathboard 29 is pivotally supported from the frame 11 to be selectively pivotable into engagement with the crop material discharged from the conditioning mechanism 25 to deflect the crop material downwardly into a swath substantially as wide as the width of cut of the header 20 before the discharge crop material can reach the windrow shields 28. Pivotal movement of the swathboard 29 is controlled by a handle control mechanism 50 described in greater detail below.

Referring now to FIGS. 1–4, the header 20 supports at a leading edge thereof a disc cutterbar 30, preferably of the modular type described in greater detail in U.S. patent application Ser. No. 08/681,242, filed concurrently herewith and entitled "Disc Cutterbar for Agricultural Implements", now U.S. Pat. No. 5,782,071, the descriptive portions of which are incorporated herein by reference. Generally, the cutterbar 30 is provided with a number of transversely spaced, rotatable disc cutters 32 carrying knives 33 that are operable to sever standing crop material by impact upon rotation of the disc cutters 32. Operative power for driving the rotation of the disc cutters 32 is supplied by the PTO shaft 16 through a gearbox 17 to a power input shaft 18 operably driving the rotation of the first disc cutter 34, which is then transferred by a drive mechanism (not shown) to the other disc cutters 32.

The cutterbar 30 is supported from the header 20 by a pair of laterally spaced support arms 35 that are connected to the remote transverse ends of the cutterbar 30. As can be seen best in FIGS. 3 and 5–7, each of the support arms 35 are mounted on two support bolts 36, 37 carried by the frame 11 so as to provide a pivotable connection between the cutterbar 30 and the header 20. The pivotable connection permits the cutterbar support arms 35 to twist about horizontal axes generally corresponding to the longitudinally extending support arms 35, so that the cutterbar 30 can deflect vertically without transmitting the twisting loads to the structure of the header 20. This configuration reduces the forces on the header side sheets 24 and eliminates the need to reinforce the side sheets 24 to withstand the flexing forces from the twisting cutterbar support arms 35.

Figure 4:
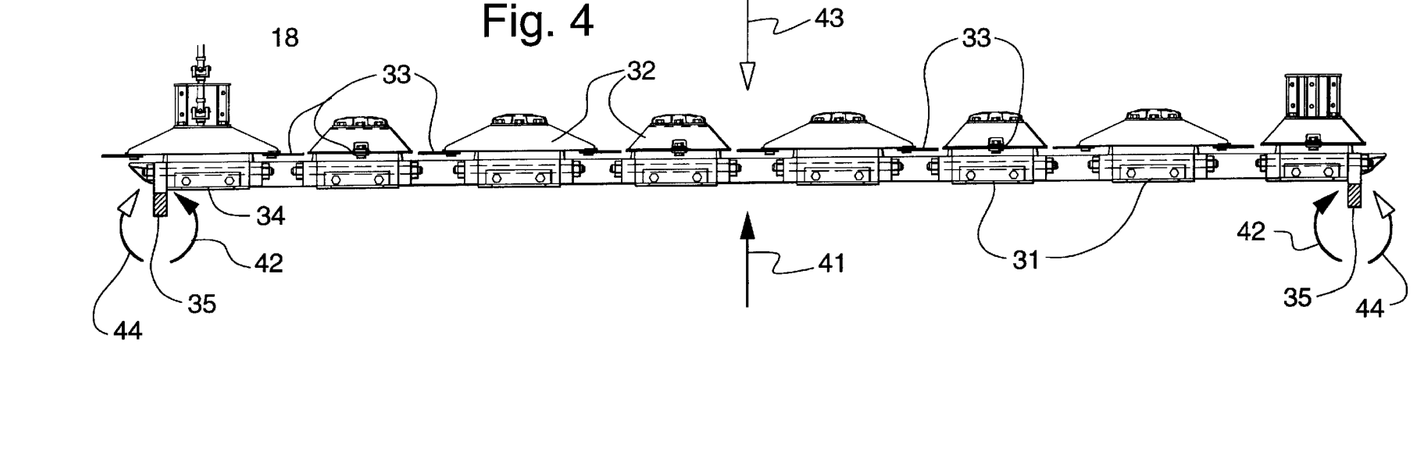
FIG. 4 is a rear elevational view of the disc cutterbar corresponding to lines 4—4 of FIG. 3, the solid and hollow arrows corresponding respectively to depict the flexing of the cutterbar support-arms.

A spherical bushing 39 is used to mount the support arms 35 on each of the support bolts 36, 37 to accommodate the twisting motion of the support arms 35. As seen in FIG. 4, an upward force, such as would be imposed on the cutterbar 30 by a rising ground undulation, represented by the solid arrow 41 will result in a twisting of the support arms 35 as represented by the solid arrows 42 and depicted by the movement of the support arm 35 in FIG. 6, as compared to the straight forward position shown in FIG. 5. Conversely, a downward force, such as would be imposed by the weight of the cutterbar 30 when a falling ground undulation is encountered, represented by the hollow arrow 43 in FIG. 4 will result in a twisting of the support arms 35 as represented by the hollow arrows 44 in FIG. 4 and depicted by the movement of the support arm 35 in FIG. 7, as compared to the position shown in FIG. 5.

Figure 6:
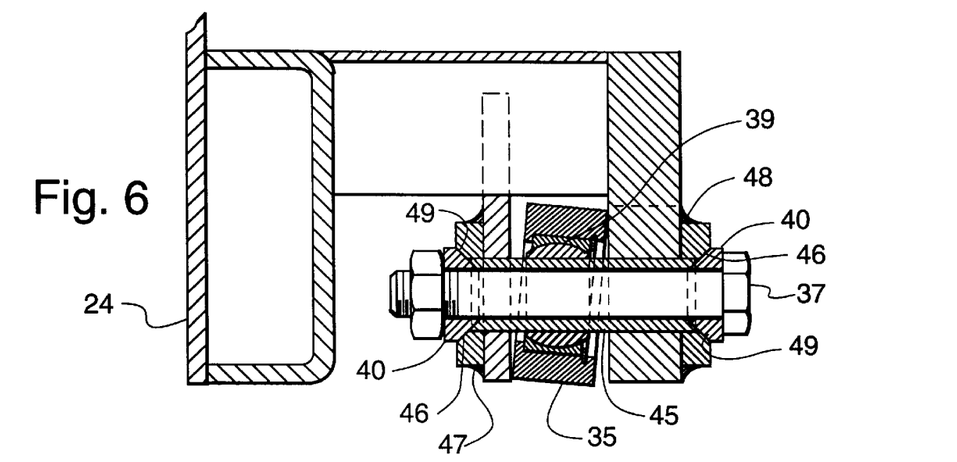
FIG. 6 is an enlarged partial cross-sectional view corresponding to FIG. 5 but with the support arm twisted in response to the flexing of the disc cutterbar corresponding to the solid arrows of FIG. 4.
Figure 7:
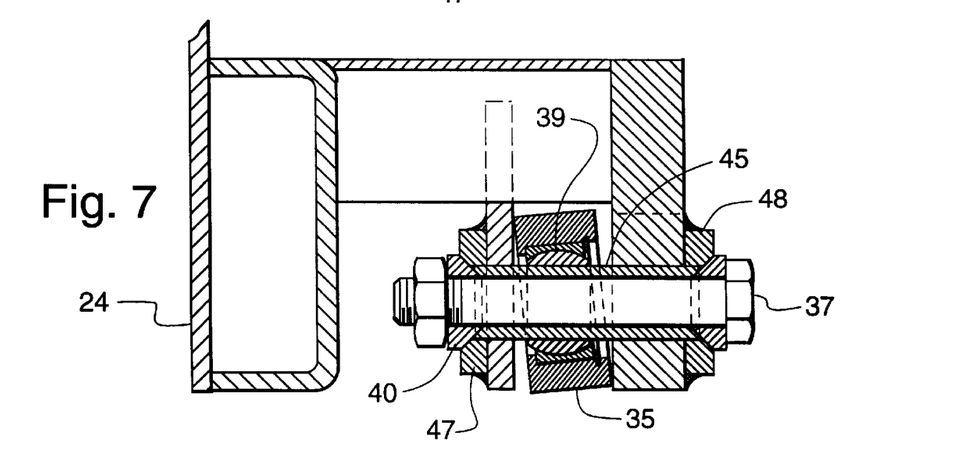
FIG. 7 is an enlarged partial cross-sectional view corresponding to FIG. 5 but with the support arm twisted in response to the flexing of the disc cutterbar corresponding to the hollow arrows of FIG. 4.
Figure 8:
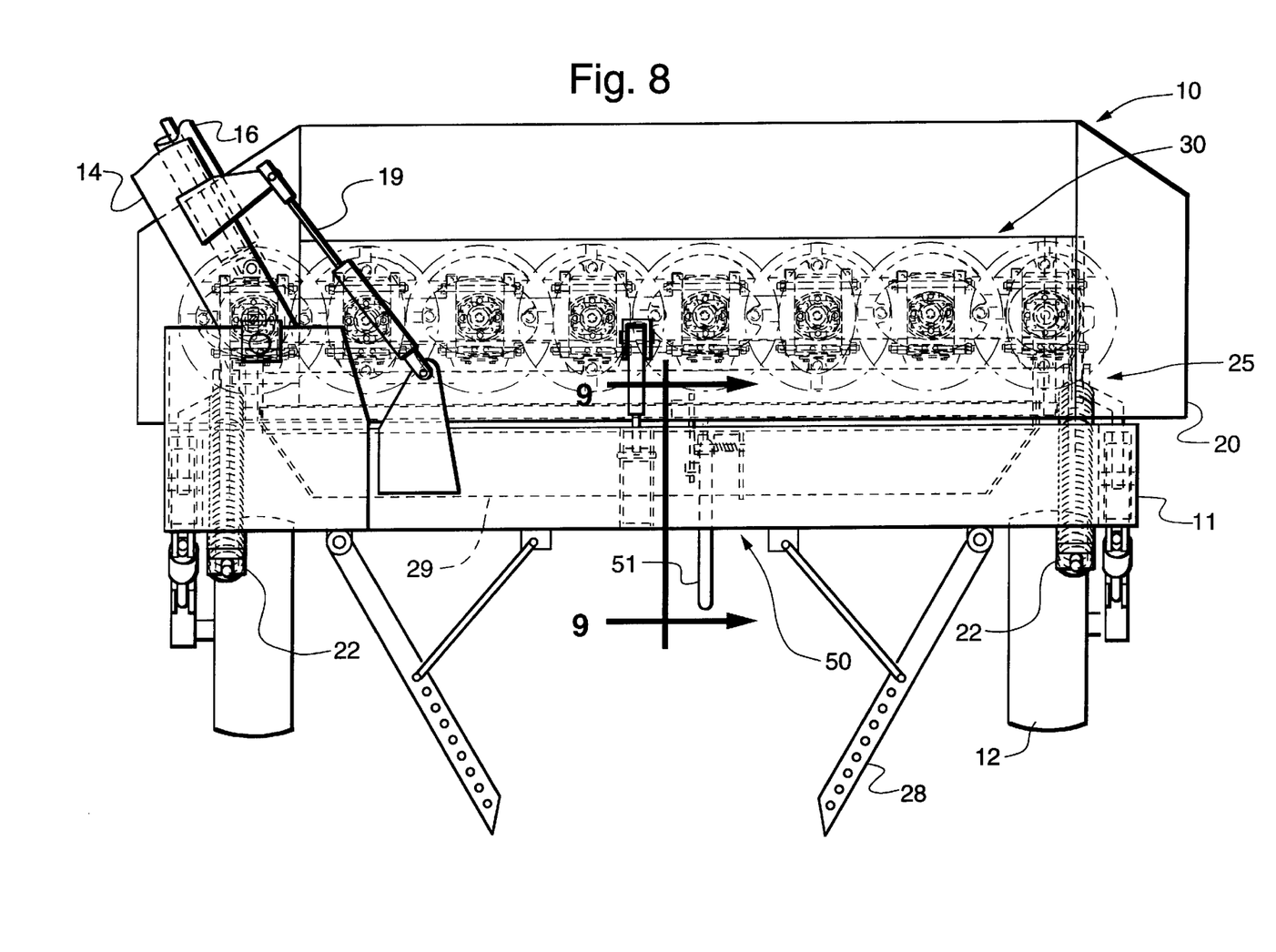
FIG. 8 is a top plan view of a disc mower conditioner incorporating the principles of the instant invention relating to the swathboard position control mechanism, the conventional draft tongue and PTO shaft being broken off for purposes of clarity.

The twisting of the support arms 35 represented in FIGS. 6 and 7 are accommodated by the spherical bushings 39 mounting each of the support arms 35 on the support bolts 36, 37. A hardened spacer 45 surrounds each of the support bolts 36, 37, which pass through the respective spacers 45. In turn, the spacers 45 and bolts 36, 37 pass through two plates 47, 48 fixed to the header to straddle support the spacer 45 and respective bolts 36, 37. The spacer 45 fits loosely in the spherical bushings 39, which permits easy removal of the spacer 45 so the cutterbar 30 can be removed readily from the header 20 when it needs to be worked on. The spherical joints 39 will permit one end of the cutterbar to drop down when the spacers 45 and respective bolts 36, 37 are removed to permit removal of a cutterbar module 31 for repair or replacement. Accordingly, both ends of the cutterbar 20 do not have to be disconnected from the header 20.

The spherical joints 39, which move relative to each other, have a small clearance and are hardened. The close clearance reduces the amount that the cutterbar 30 can deflect vertically as the support arms 35 move in the vertical plane by rocking about the two pivotal connections. A minimal vertical movement of the cutterbar 30 is important to reduce the chance of the knives 33 hitting the lower conditioning roll 26 and to minimize the wear on the drive coupling 18.

Figure 5:
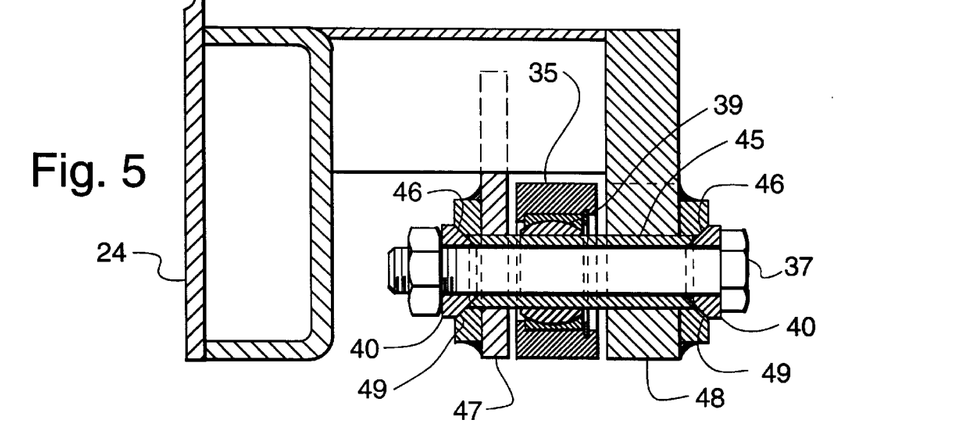
FIG. 5 is an enlarged partial cross-sectional view taken along lines 5—5 of FIG. 3 to show the mounting of the cutterbar support arm by a spherical bushing.

As best seen in FIGS. 5–7, the spherical bushings 39 are positioned by the hardened spacer 45 which has an internal conical seat 46 on each end thereof alignable with conical sockets 49 in the corresponding plates 47, 48. Conical washers 40 are positioned at each end of the spacer 45. The respective bolt 36, 37 clamps the corresponding conical washers 40 into both the conical sockets 49 of the plates 47, 48 and the conical seats 46 of the spacers 45 due to the deflection of one of the header plates 47. The conical washers 40 position the spacers 45 radially within the plate bores, eliminating the looseness and possibility of further looseness due to wear.

Referring now to FIGS. 8–12, the swathboard position control mechanism 50 can best be seen. The swathboard 29 is pivotally moveable about a pivot member 29a between a raised position, as shown in phantom in FIG. 10 in which the conditioned crop material discharged from the conditioning mechanism 25 is consolidated by the windrow shields 28, and a lowered position in which the crop material discharged from the conditioning mechanism 25 is deflected downwardly to the ground before reaching the windrow shields 28. The control mechanism 50 is operable to control the position of the swathboard 29.

Figure 9:
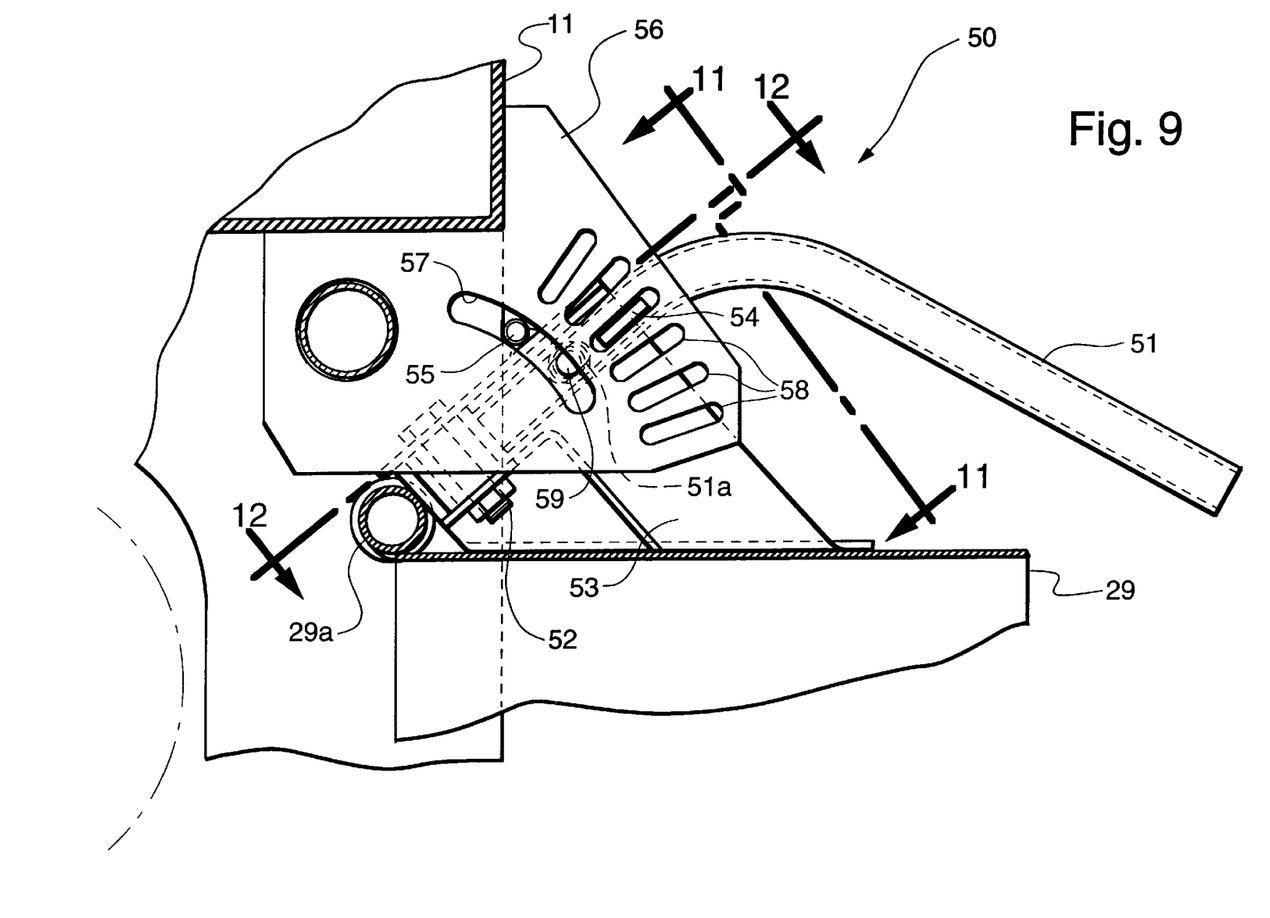
FIG. 9 is an enlarged cross-sectional view of the disc mower conditioner taken along lines 9—9 of FIG. 8 to show a side elevational view of the swathboard position control mechanism.
Figure 10:
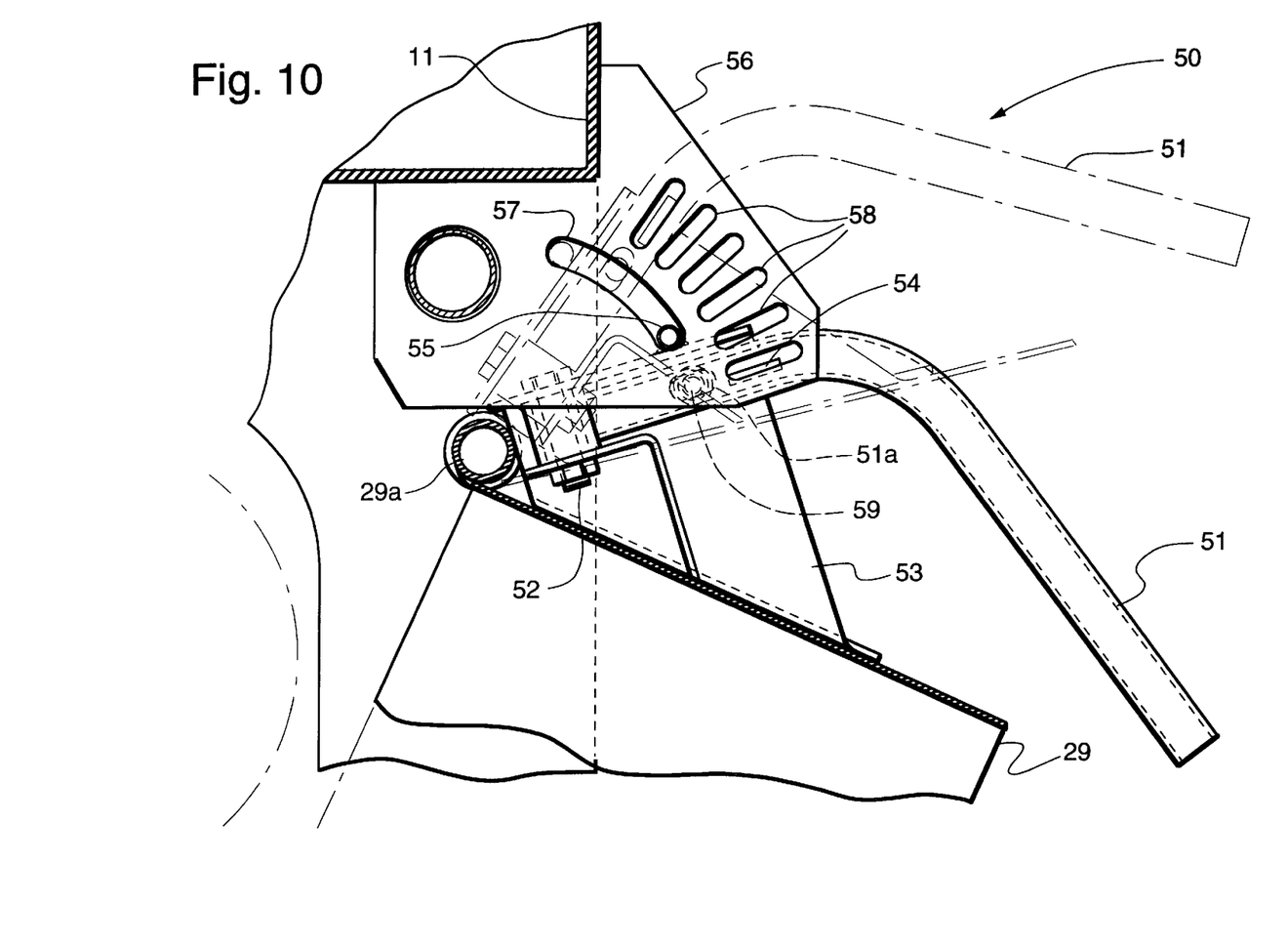
FIG. 10 is an enlarged cross-sectional view of the disc mower conditioner similar to that of FIG. 9, but with the handle control mechanism bottomed out against the down stop, the phantom lines depicting the relative position of the handle control mechanism at the permissible extreme raised position.
Figure 11:
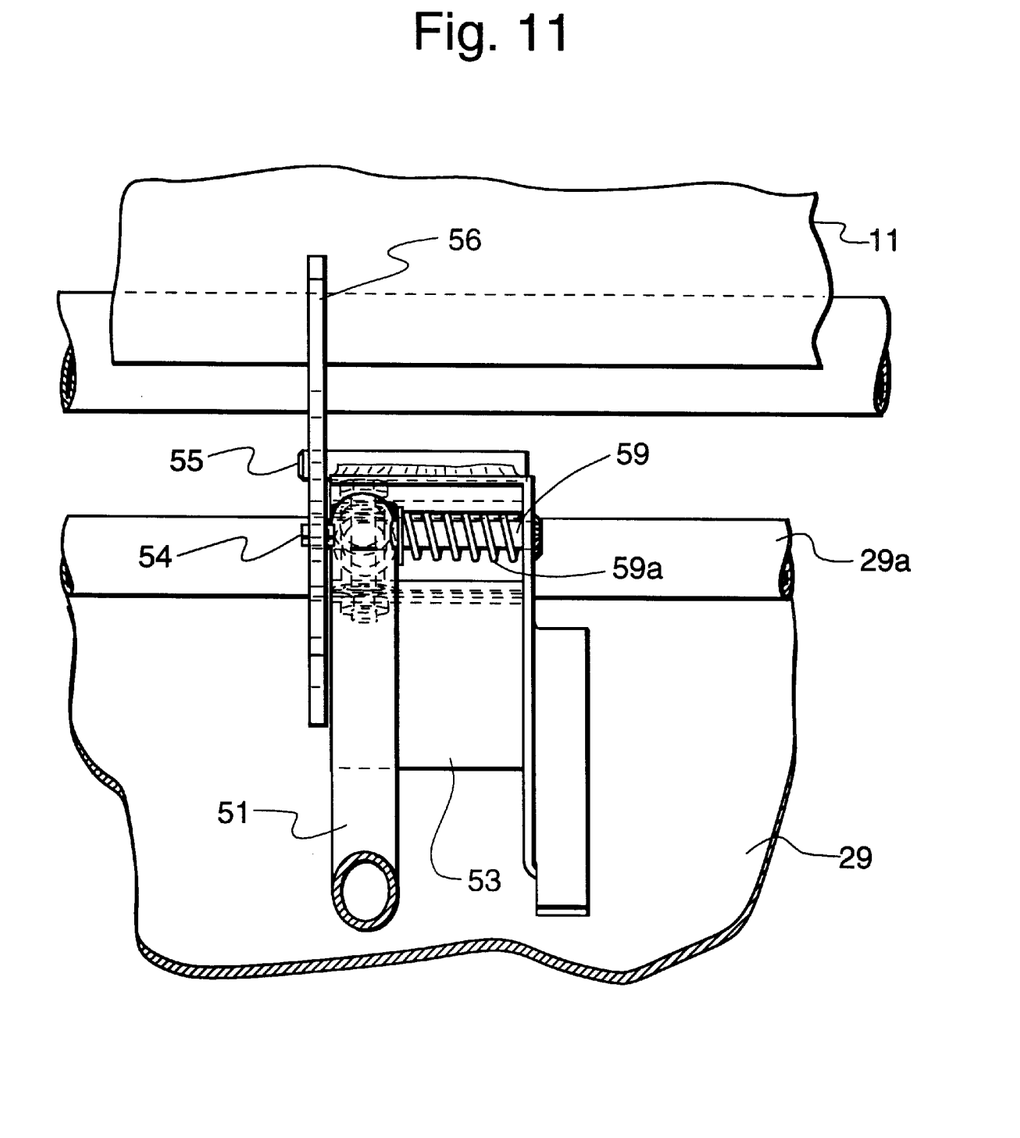
FIG. 11 is a partial cross-sectional view of the handle control mechanism taken along lines 11—11 of FIG. 9.
Figure 12:
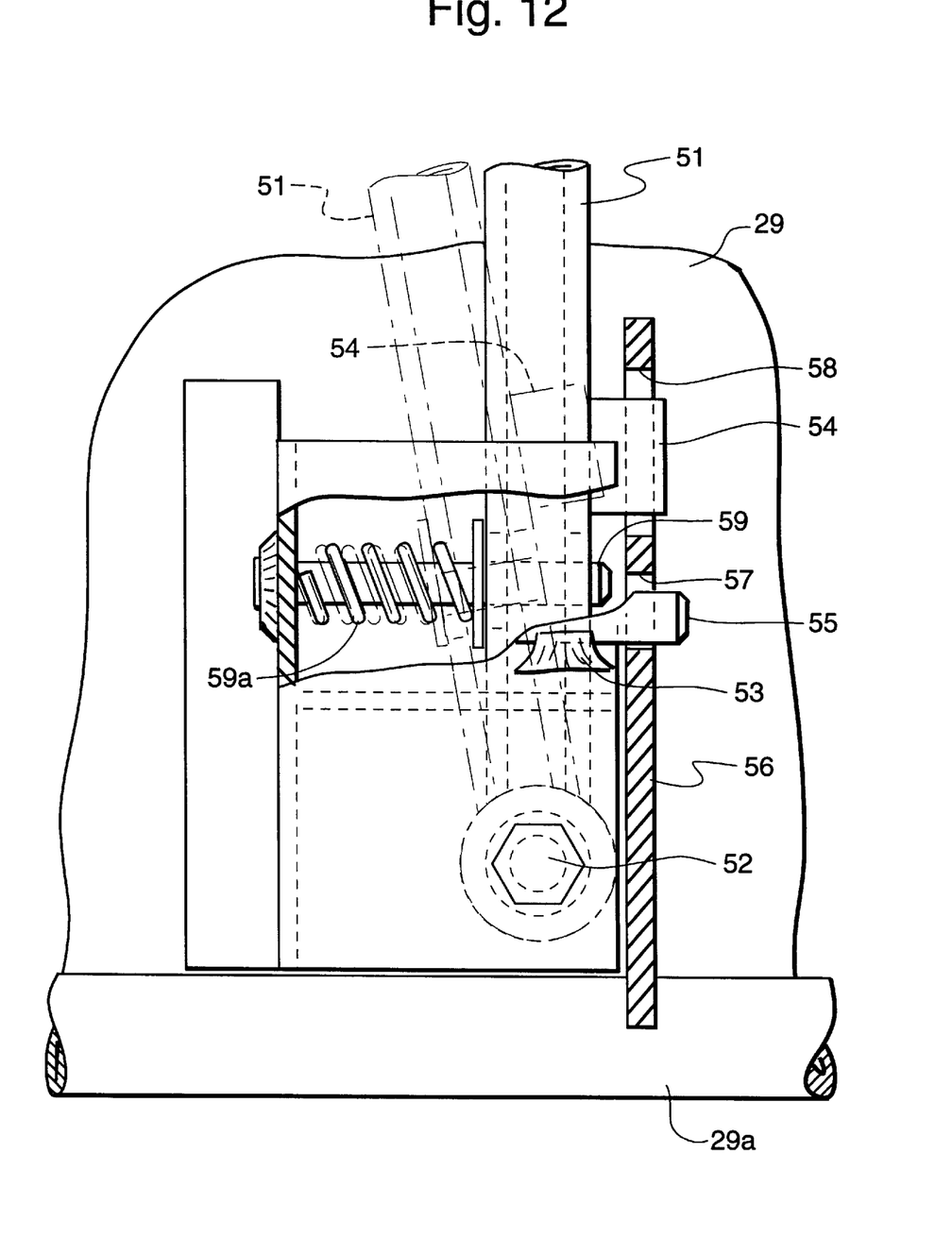
FIG. 12 is a partial cross-sectional view of the handle control mechanism taken along lines 12—12 of FIG. 9; the movement of the handle to vary the position of the swathboard being shown in phantom.
Figure 13:
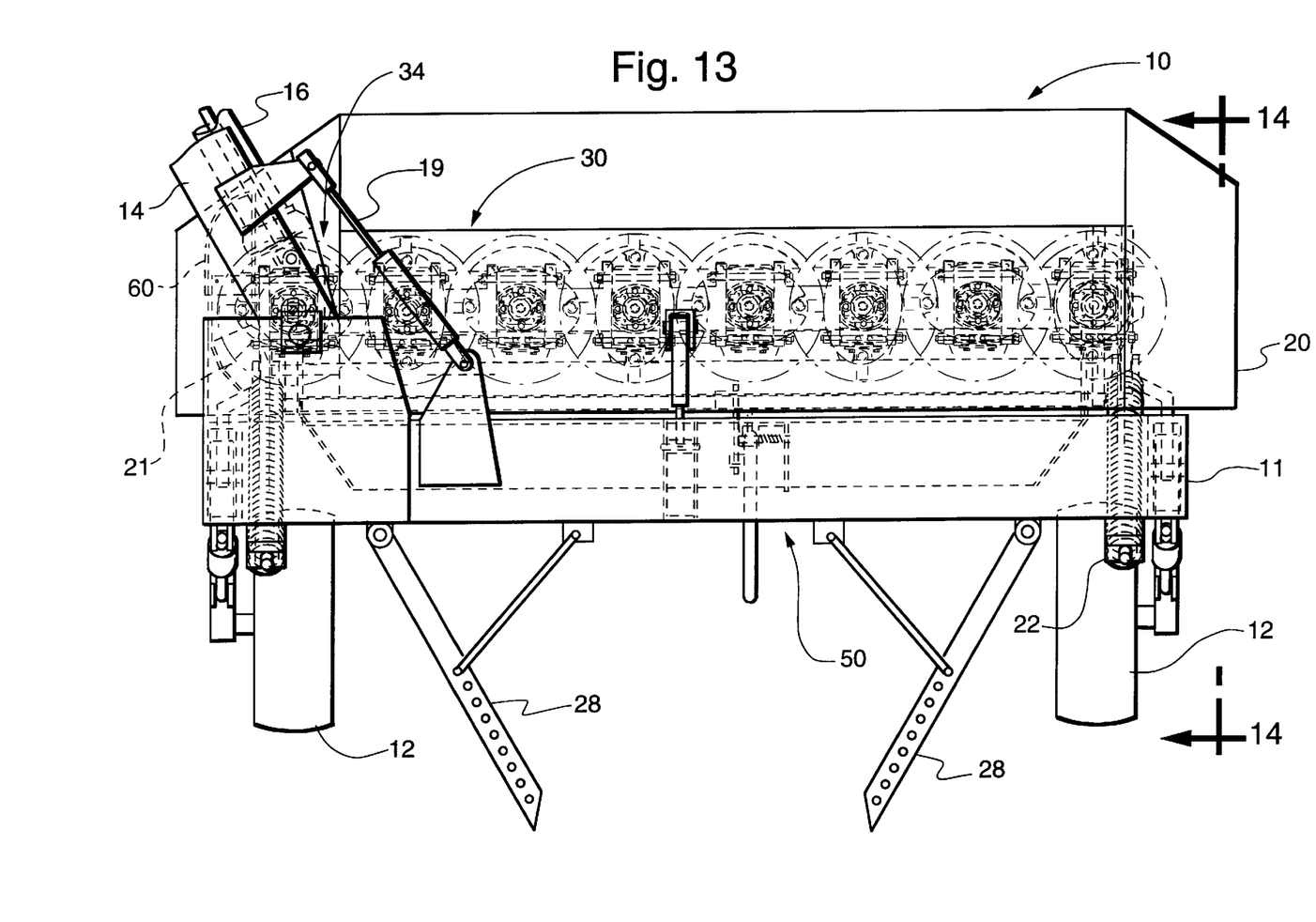
FIG. 13 is a top plan view of an alternative disc mower conditioner incorporating the principles of the instant invention relating to the viney crop guide, the conventional draft tongue and PTO shaft being broken off for purposes of clarity.
Figure 14:
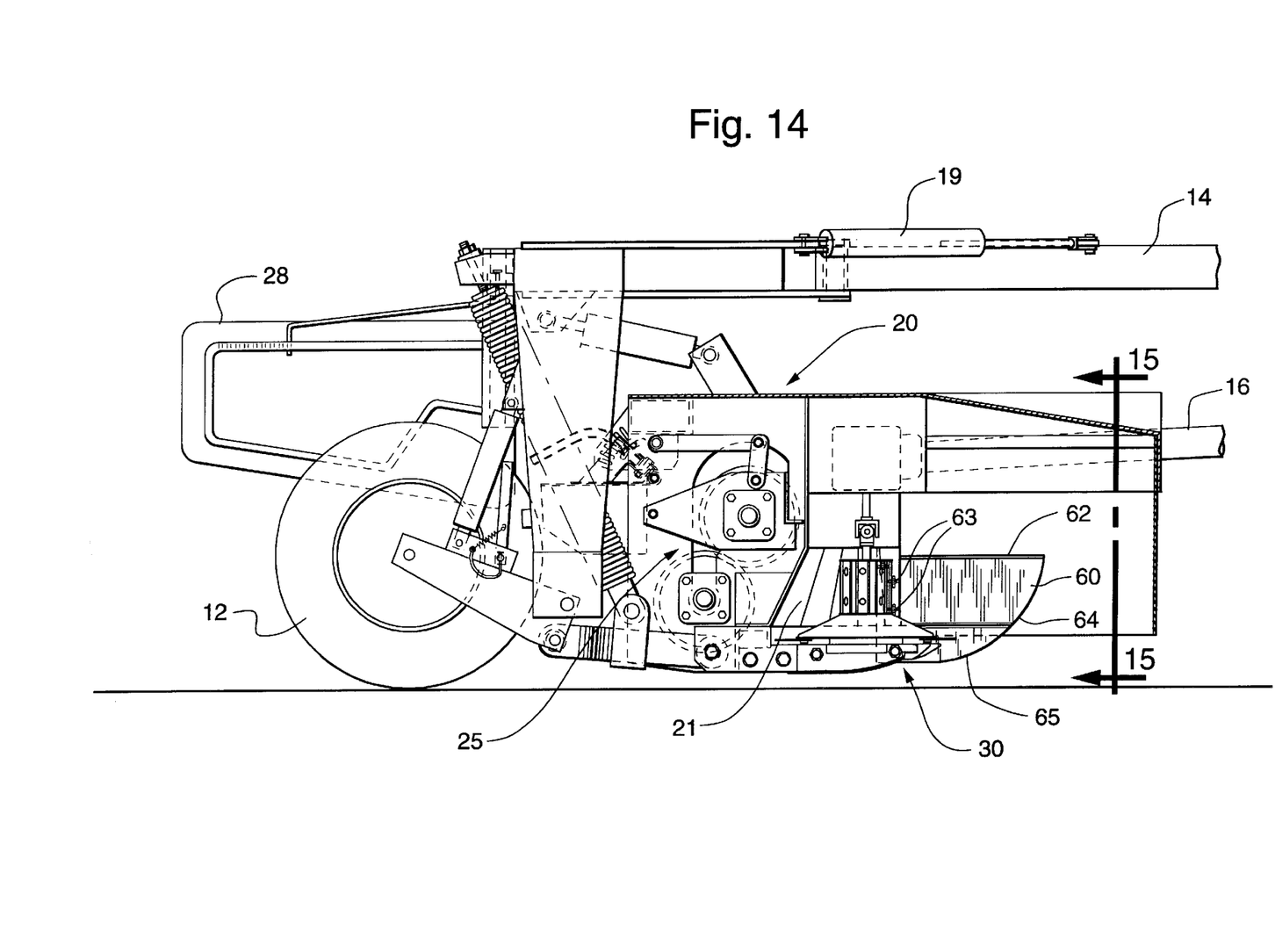
FIG. 14 is a cross-sectional view of the disc mower conditioner taken along lines 14—14 of FIG. 13 to depict a right side elevational view of the disc mower conditioner.
Figure 15:
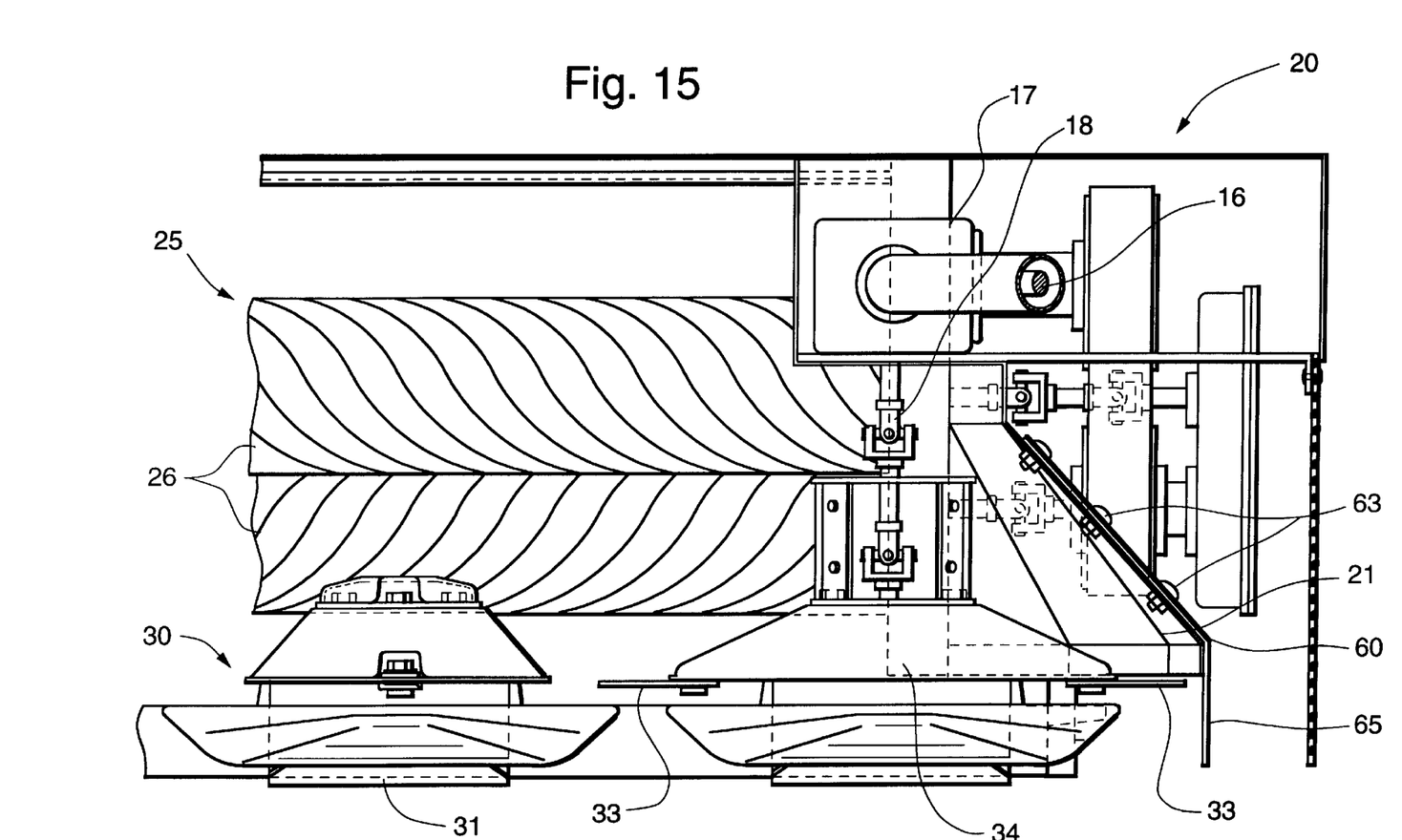
FIG. 15 is a partial cross-sectional view of the disc mower conditioner taken along lines 15—15 of FIG. 14 to depict a front elevational view of the disc mower conditioner.
Figure 16:
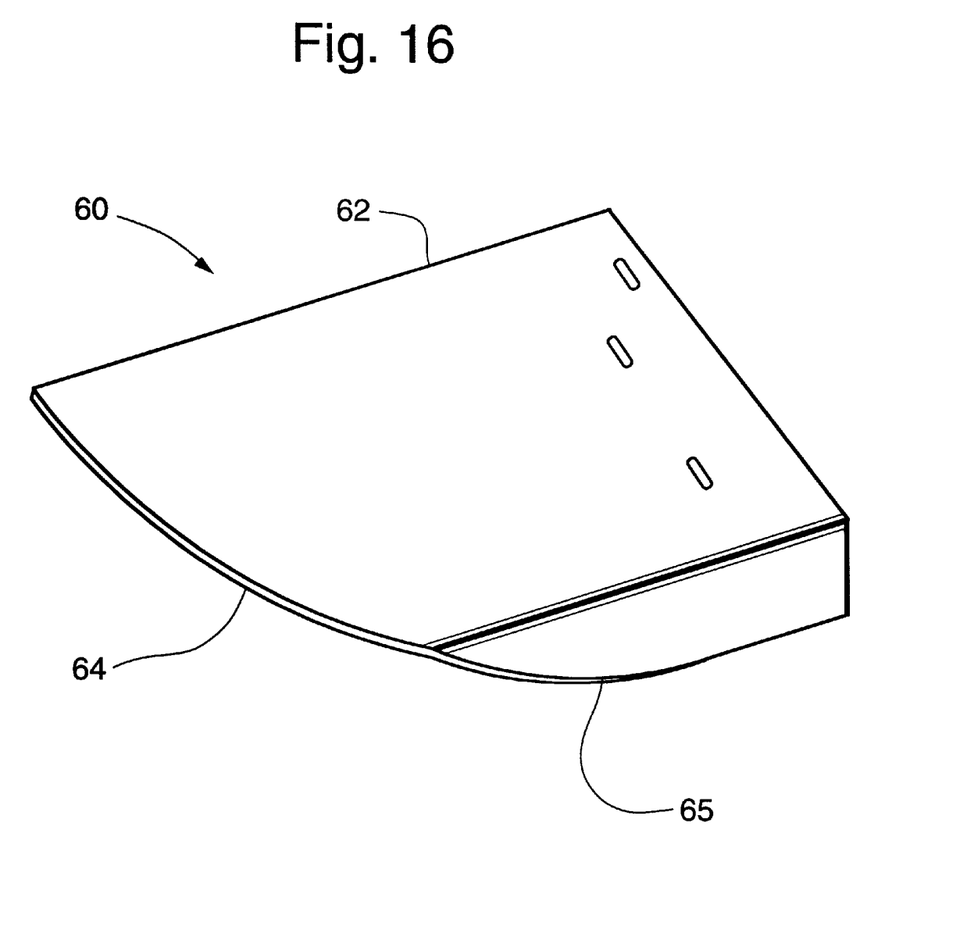
FIG. 16 is a perspective detail view of the viney crop guide.

The control mechanism 50 includes an actuating handle 51 that is attached by a bolt 52 to a bracket 53 that in turn is affixed to the swathboard 29, as by welding. The bolt 52 also permits a transverse pivoting movement of the handle 51 to permit adjustment of the swathboard 29 as will be described in greater detail below. The bracket 53 carries a stop pin 55 which is fixed relative thereto and positionable within a curved slot 57 formed within an associated position bracket 56. The position bracket 56 also has formed therein a plurality of elongated openings 58 that are aligned in an arc to be engageable with a locking tab 54 affixed to the handle 51 and moveable therewith about the bolt 52.

The bracket 53 also carries a cantilevered spring support pin 59 and an associated spring 59a that is compressed between the handle 51 and the bracket 53 to bias the pivotal movement of the handle 51 about the pivot bolt 52 toward engagement with the position bracket 56. The cantilevered pin 59 passes through the actuating handle 51 to terminate just short of the position bracket 56. Because of the nature of the pivotal movement of the handle 51 about the bolt 52, the opening 51a in the handle 51 for passage of the pin 59 must be somewhat slot-shaped.

In operation, the position of the swathboard 29 to obtain the best windrow configuration from the crop material being discharged from the conditioning mechanism 25 is a function of the crop moisture, weight, volume and the desired windrow width. To vary the position of the swathboard 29, the operator needs to pivotally deflect the actuating handle 51 to release the locking tab 54 from the elongated opening 58 in which the tab 54 was engaged and reposition the swathboard 29, which through the bracket 53 is affixed to the handle 51 and is directly movable therewith, by moving the handle 51 until the licking tab 54 is aligned with the appropriate elongated opening 58, whereupon the operator allows the compression spring to re-engage the locking tab 54 with the selected elongated opening.

The stop pin 55 rides within the curved slot 57 formed in the position bracket 56. In the event that the handle 51 is inadvertently dropped, the engagement of the stop pin 55 with the curved slot 57 will bottom out and prevent the swathboard 29 from dropping so low as to impact the conditioning mechanism. Likewise, the upper limit of the curved slot 57 will allow the stop pin 55 to bottom out against the top of the curved slot 57 and, thereby, limit the complete range of movement to whatever is defined by the curved slot 57.

Referring now to FIGS. 13–16, an optional crop guide 60 for use in assisting the proper cutting of viney crops can best be seen. The guide 60 is positioned at the left end of the disc mower conditioner header 20 to the left of the cutterbar 30. The guide 60 consists of a plate 62 which is detachably connected to the shroud structure 21 surrounding the left end of the cutterbar 30 by fasteners 63. The forward edge 64 of the plate 62 is curved downwardly and rearwardly to guide vine stems downward as the plate 62 is moved forwardly into the uncut crop.

As the vines move downward through engagement with the curved leading edge 64, they pass into the path of the cutting knife 33 of the first cutter module 34, whereupon the vines are cut to permit the rearward movement of the severed portion of the vine to pass through the conditioning rolls 26 freely. The lower portion 65 of the plate 62 is bent inwardly to improve the flow and control the crop that may be carried around by the first disc cutter 34. The crop guide 60 is designed to be an optional attachment, easily installed to facilitate use in viney crop conditions and removal in normal operating conditions.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed:

1. In a mower conditioner having a mobile frame; a crop harvesting header suspended from said frame for movement relative thereto and including a rotary cutterbar forwardly positioned from said header to sever standing crop material from the ground by impact action, said rotary cutterbar having a plurality of disc cutters transversely spaced along said header including a first disc cutter located at an inboard end of said cutterbar; said header having a shroud encircling said first disc cutter, the improvement comprising:

a crop guide detachably connected to said shroud to guide crop material toward said first disc cutter for engagement therewith to sever said crop material.

2. The mower conditioner of claim 1 wherein said crop guide is generally planar and is detachably mounted to said shroud.

3. The mower conditioner of claim 2 wherein said crop guide further includes a lower portion bent inwardly to direct crop material inwardly toward said first disc cutter.

* * * * *